United States Patent
Lewis

Patent Number: 5,480,545
Date of Patent: Jan. 2, 1996

[54] CROSS BRACED VACUUM WASHER

[75] Inventor: Frederick S. Lewis, Nashua, N.H.

[73] Assignee: Ingersoll-Rand Company, Woodcliff Lake, N.J.

[21] Appl. No.: 285,462

[22] Filed: Aug. 3, 1994

[51] Int. Cl.⁶ .................................... B01D 33/06
[52] U.S. Cl. ............... 210/380.3; 210/381; 210/404; 162/368
[58] Field of Search ......................... 210/402, 404, 210/380.3, 381; 162/368

[56] References Cited

U.S. PATENT DOCUMENTS

| | | | |
|---|---|---|---|
| 2,073,384 | 3/1937 | Barnebl | 210/402 |
| 2,626,058 | 1/1953 | Allman et al. | 210/402 |
| 3,105,043 | 9/1963 | Rich et al. | 210/402 |
| 3,590,453 | 7/1971 | Bryand | 210/402 |
| 3,773,614 | 11/1973 | Pennington | 210/402 |
| 3,829,360 | 8/1974 | Holz | 210/402 |
| 4,105,563 | 8/1978 | Kosonen | 210/402 |
| 4,551,248 | 11/1985 | Lenac | 210/404 |
| 4,619,737 | 10/1986 | Holz | 210/402 |
| 4,973,385 | 11/1990 | Jean et al. | 210/404 |

*Primary Examiner*—Peter A. Hruskoci
*Assistant Examiner*—Theodore M. Green
*Attorney, Agent, or Firm*—Walter C. Vliet

[57] ABSTRACT

A washer drum is provided with unique cross bracing which prevents twisting, reduces vortex formation in radial inflow ports, and further provides support for the decking between closely spaced intermediate heads.

5 Claims, 3 Drawing Sheets

CROSS BRACED VACUUM WASHER

BACKGROUND OF THE INVENTION

This invention relates generally to vacuum washers and more particularly to cross braced vacuum washers having a means for stiffening the drum heads and preventing vortex formation of the filtrate in radial inflow ports.

In the conventional end drainage washer the radial ports have little resistance to relative rotation of the inner and outer head plates forming the ports. The relative rotation allows twisting of the washer covering generally comprised of a corrugated deck, winding wire and face wire. This results in premature failure of the washer covering. In addition, vortexing of the filtrate in the radial ports allows gas to separate from the filtrate and hampers the vacuum operation of the washer drum.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a cross braced vacuum washer including a washer drum of the type having generally longitudinal surface collection channels delivering extracted liquid to radially formed channels interspaced between adjacent spaced heads, the improvement comprising a brace disposed in the radially formed channel between the heads radially inward of the longitudinal surface collection channel and in supporting contact therewith.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

A vacuum washer generally comprises a rotating cylinder usually covered with a wire screen which is emersed in a pulp slurry contained in a vat. The face of the cylinder is divided into longitudinal segments called ports.

In operation, a differential pressure is applied across the face of the cylinder, which draws liquid out of the slurry through the ports leaving a pulp mat on the face of the cylinder. The differential pressure is created by either a drop leg or vacuum pump. A drop leg is a vertical column of liquid acting as a siphon. Vacuum washers often use a pipe outside of the washer as a drop leg to increase the available vacuum.

With the aid of a valve, the vacuum to some of the ports may be cut off, allowing the pulp sheet to be removed more readily and to prevent excessive air being sucked into the vacuum creating drop leg. A valveless washer uses internal ports to create its own vacuum. The valveless washer operates with a very low vacuum and generally does not require the use of a valve.

Figure 1:
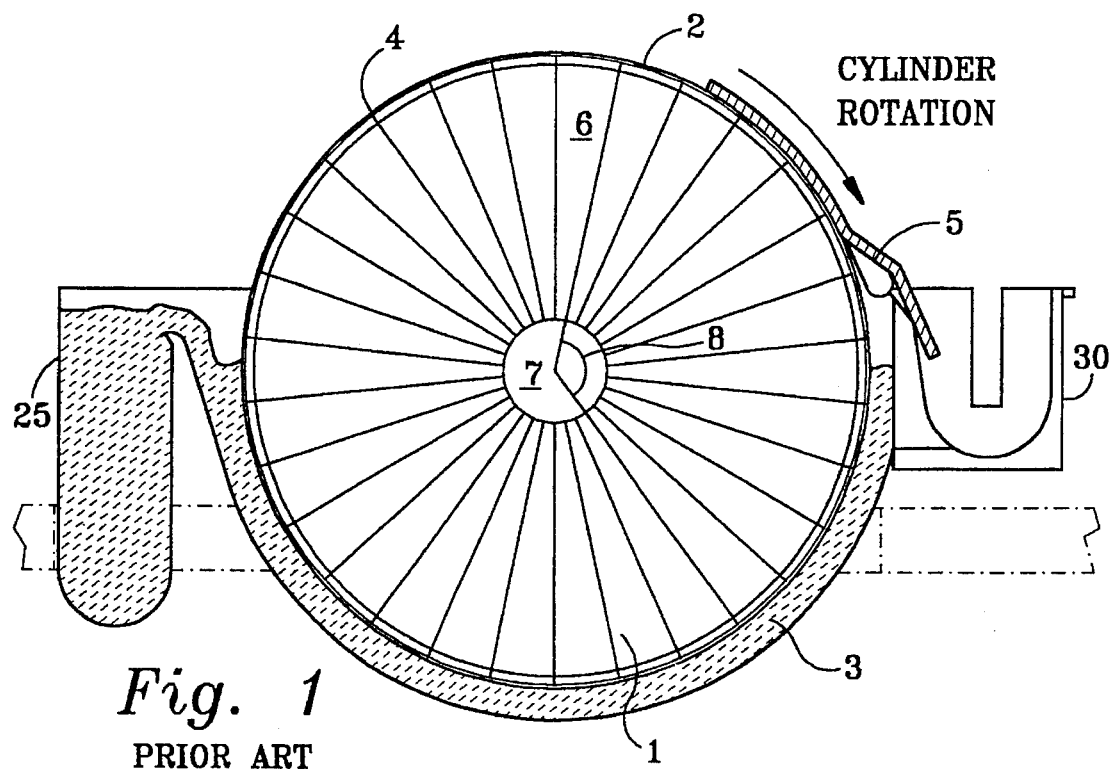
FIG. 1 is an end cross section of a washer drum according to the prior art taken through the end drainage portion of the drum.

Referring to FIG. 1 the end view of a vacuum washer according to the prior art is shown and generally designated by the reference numeral 1. The washer is comprised of a rotating cylinder 2 having a series of longitudinal ports 4 for conducting filtrate collected on the surface of the drum to a collection point such as the radial inflow ports 6 shown on FIG. 1. The radial ports 6 conduct the collected filtrate to a central filtrate removal pipe 9, as best seen in FIG. 2.

The washer cylinder 2 is shown in FIG. 1 emersed in a vat 3 containing a supply of pulp slurry 25 which is continuously provided to the vat at a controlled rate. The pulp mat formed on the cylinder is shown being removed by a doctor blade 5 and conducted to a fiber removal system 30.

As previously discussed, vacuum may be applied to the system as, for example, in the sector, designated by the reference numeral 7, to aid in the formation of the mat. The vacuum may be blanked off by a valve means in the sector designated by the reference numeral 8. This assists in mat removal and allows for the gentle initial mat formation on the submerging sectors of the drum prior to vacuum application.

Figure 2:
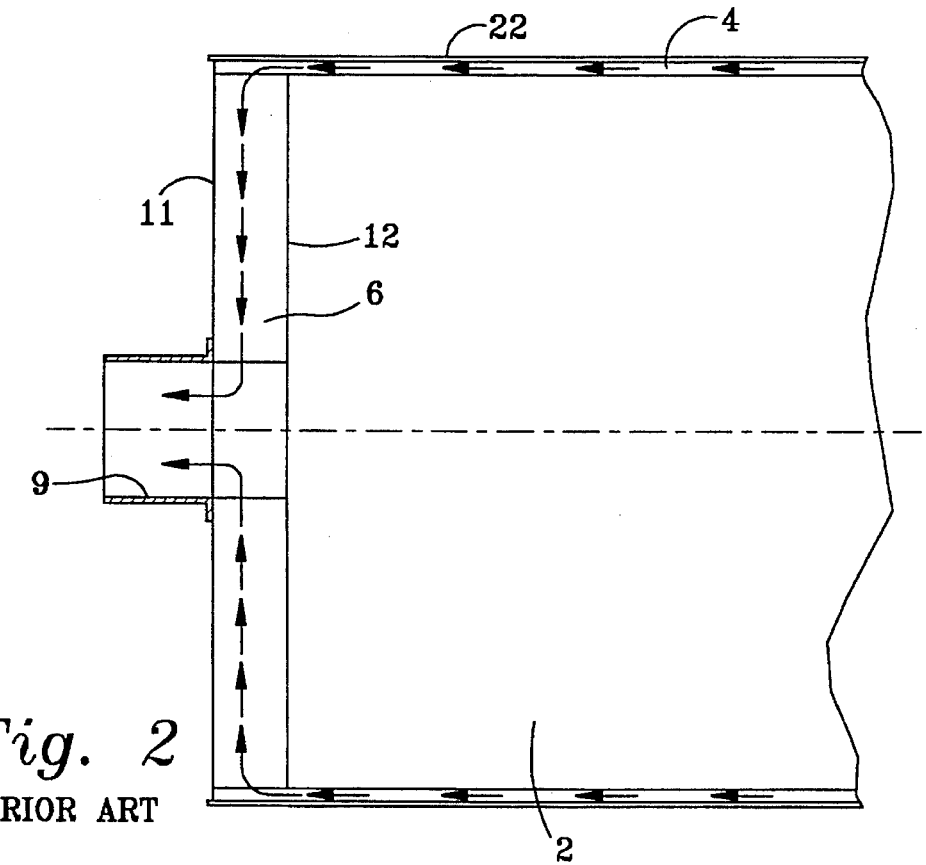
FIG. 2 is a partial longitudinal cross section of the drum showing the filtrate flow path according to the prior art.

As shown in FIG. 2, the surface of the drum is covered with a filter screen or wire 22 which permits the recovered filtrate to pass through the mat formation and screen wire into the longitudinal channels 4. The channels 4 direct the filtrate to the end of the drum where it enters the radial inflow ports 6 formed between an outer head 11 and an inner head 12 in the end of the drum 2. The radial ports 6 conduct the filtrate to a central discharge pipe 9 which in turn may be connected to a barometric vacuum leg or a vacuum pump as the case may be (not shown).

Figure 3:
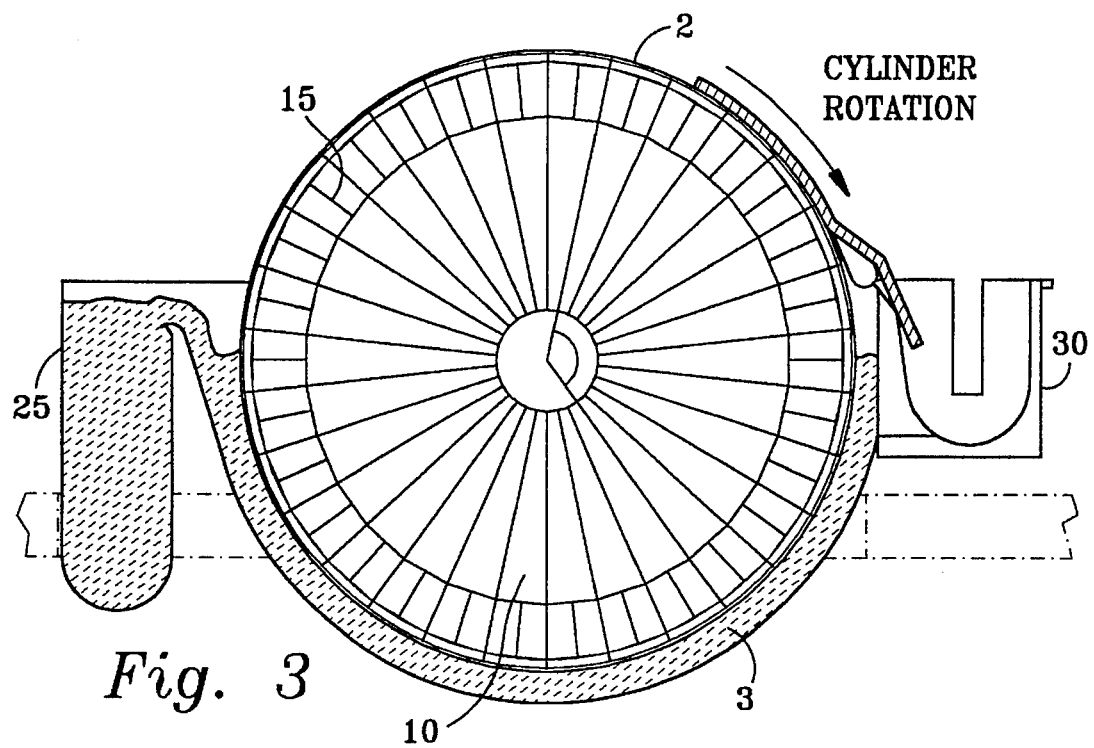
FIG. 3 is a cross section of the end of a washer drum according to the present invention taken through the end drainage portion of the drum.
Figure 4:
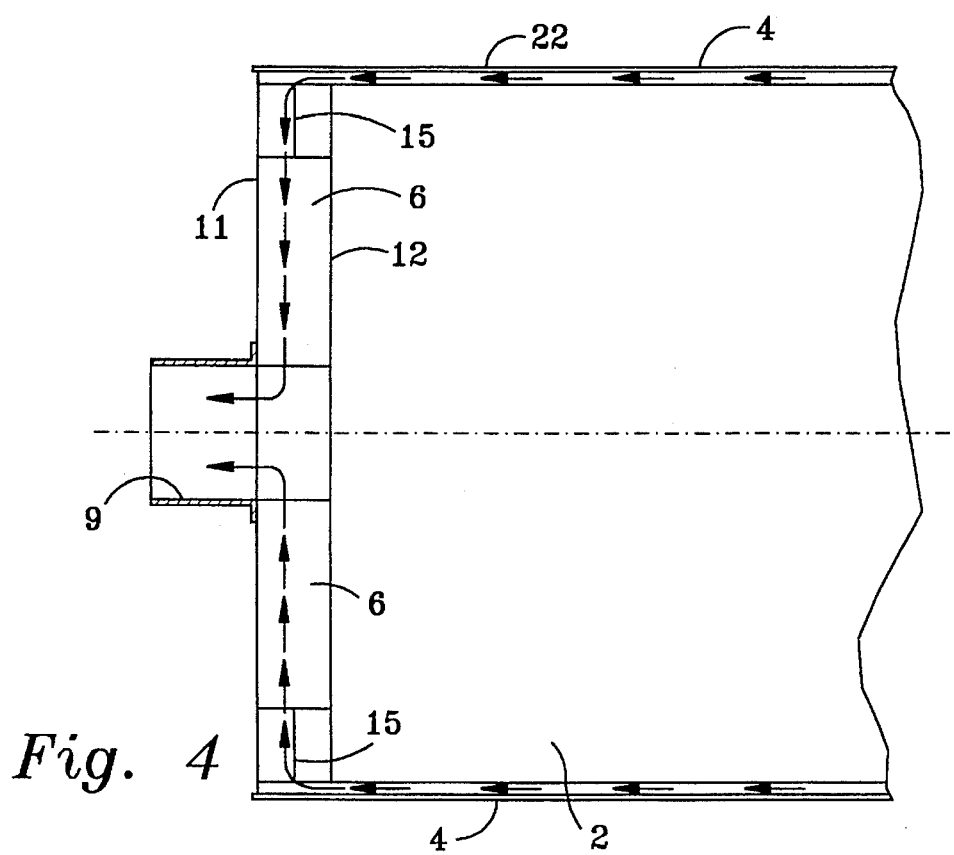
FIG. 4 is a partial longitudinal cross section of the drum showing the cross braces of the present invention.
Figure 5:
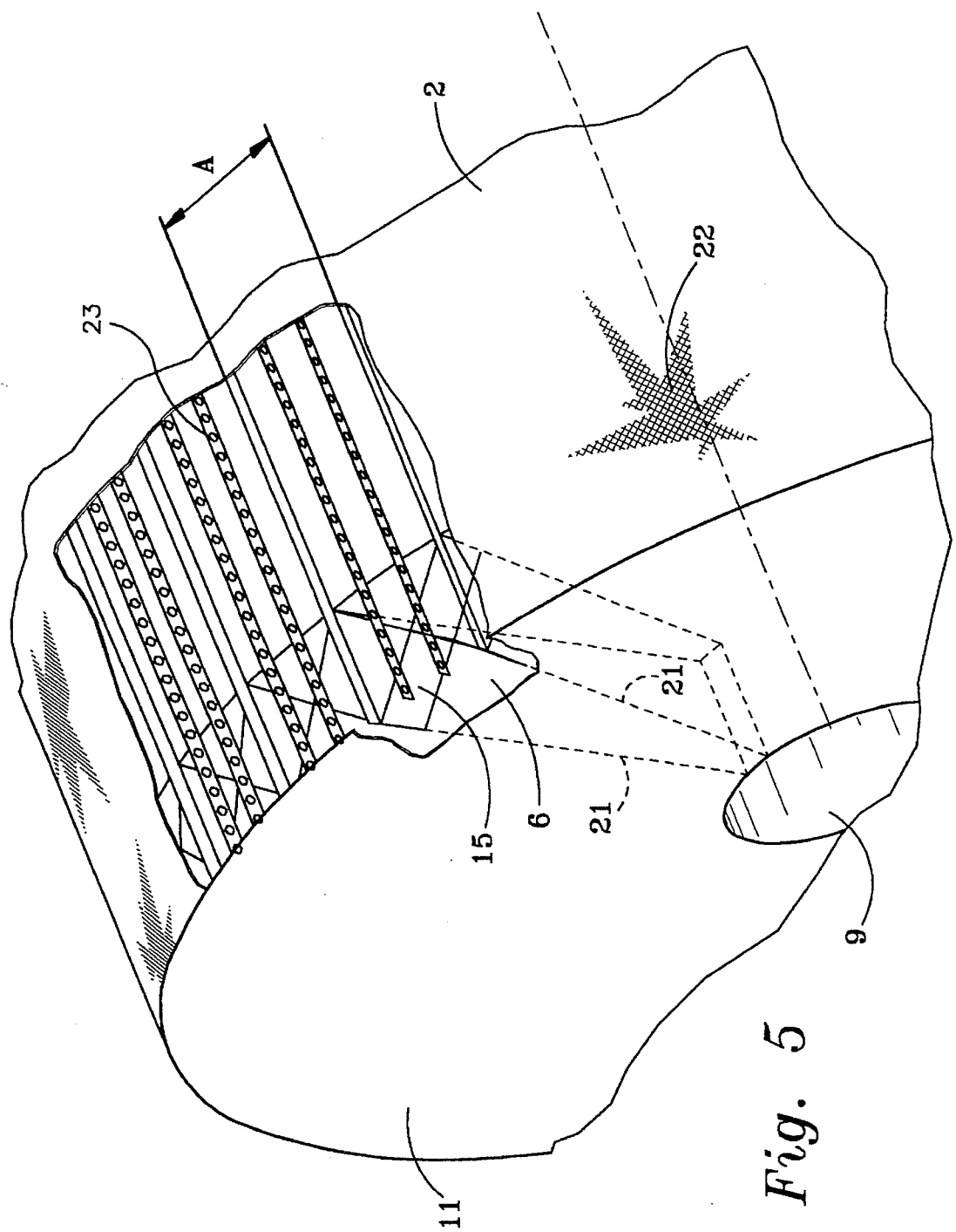
FIG. 5 is a partial isometric depiction of a cross braced washer drum according to the present invention.

Referring now to FIGS. 3, 4, and 5, in a vacuum washer 10 according to the present invention, a cross brace 15 is provided at the transition of the longitudinal port 4 and the radial port 12. The cross brace 15 is located at a point radially inward of the longitudinal port 4 and being in supporting contact with the decking 23 (best seen in FIG. 5) which forms in fact the longitudinal collecting channels. The radial inflow port 6 is formed between the outer head 11 and the inner head 12 and two adjacent radial ribs 21, as best seen in FIG. 5.

The cross brace 15 is open to flow in the radial direction so as to receive the filtrate and permit its introduction into the radial inflow port or channel 6 for further conducting to the filtrate removal pipe 9. The cross brace 15 is further connected to both the outside end plate 11 and the inside end plate 12 thereby stiffening the end of the drum. This prevents relative twisting between the inside end plate and the outside end plate as a result, for example, of the torque applied to the filtrate removal pipe which is used to rotate the drum 2 in vat 3. In large drums with relatively thin plates, this is an important feature, particularly where high cost alloys are utilized due to the corrosive nature of the products being filtered.

In addition to the above benefit it has been observed in the prior art that filtrate received in the radial inflow channels had a tendency to form a vortex which promoted the separation of the filtrate and the entrained gas therein. This substantially reduced the effectiveness of the vacuum as compared to running the radial inflow channels in a slightly flooded fashion.

A further advantage of the cross bracing is the support provided to the decking 23 suspended between the inner and the outer heads.

Thus, it is apparent that the cross bracing 15 provided according to the present invention produces a threefold advantage of resisting torsional twist between the inner and outer head, reducing the possibility of vortex forming in the radial port and providing support to the decking bridged between the inner and outer heads.

What is claimed is:

1. A washer drum of the type having generally longitudinal surface collection channels delivering extracted liquid to radially formed channels interspaced between adjacent closely spaced heads disposed at one end of said drum, the improvement comprising:

a diagonal cross brace disposed in said radially formed channel between said heads radially inward of said longitudinal surface collection channel and in supporting contact therewith.

2. A washer drum according to claim 1, wherein:

said brace further serves to direct said liquid from said collection channels to said radially formed channels.

3. A washer drum according to claim 2, wherein:

said brace is attached to said adjacent spaced heads as a means for transmitting torque from one head to the other and said washer drum in either direction of rotation.

4. A washer drum according to claim 2, wherein:

said brace is open to flow of said extracted liquid in a radially inward direction.

5. A washer drum according to claim 4, wherein:

said brace further prevents vortex formation in said radially formed channel.

* * * * *